July 26, 1966 B. H. BJORKMAN ETAL 3,263,174

DEVICE FOR DERIVING FROM A CONTROL A.C.-VOLTAGE OF RELATIVELY HIGH FREQUENCY AN A.C.-VOLTAGE OF LOWER FREQUENCY AND WITH A PREDETERMINED PHASE POSITION IN TIME

Filed Sept. 3, 1963

4 Sheets-Sheet 1

INVENTOR.
BENGT H. BJORKMAN
NILS S. NILSSON
BY [signature]
AGENT

July 26, 1966 B. H. BJORKMAN ETAL 3,263,174

DEVICE FOR DERIVING FROM A CONTROL A.C.-VOLTAGE OF RELATIVELY HIGH FREQUENCY AN A.C.-VOLTAGE OF LOWER FREQUENCY AND WITH A PREDETERMINED PHASE POSITION IN TIME

Filed Sept. 3, 1963 4 Sheets-Sheet 2

INVENTOR.
BENGT H. BJORKMAN
NILS S. NILSSON
BY [signature]
AGENT

July 26, 1966 B. H. BJORKMAN ETAL 3,263,174

DEVICE FOR DERIVING FROM A CONTROL A.C.-VOLTAGE OF RELATIVELY HIGH FREQUENCY AN A.C.-VOLTAGE OF LOWER FREQUENCY AND WITH A PREDETERMINED PHASE POSITION IN TIME

Filed Sept. 3, 1963 4 Sheets-Sheet 3

INVENTOR.
BENGT H. BJORKMAN
NILS S. NILSSON
BY Frank R. Trifari
AGENT

DEVICE FOR DERIVING FROM A CONTROL A.C.-VOLTAGE OF RELATIVELY HIGH FREQUENCY AN A.C.-VOLTAGE OF LOWER FREQUENCY AND WITH A PREDETERMINED PHASE POSITION IN TIME

Filed Sept. 3, 1963

4 Sheets-Sheet 4

INVENTOR.
BENGT H. BJORKMAN
NILS S. NILSSON
BY [signature]
AGENT

United States Patent Office 3,263,174

Patented July 26, 1966

3,263,174

DEVICE FOR DERIVING FROM A CONTROL A.C.-VOLTAGE OF RELATIVELY HIGH FREQUENCY AN A.C.-VOLTAGE OF LOWER FREQUENCY AND WITH A PREDETERMINED PHASE POSITION IN TIME

Bengt Harry Bjorkman, Sollentuna, and Nils Sture Nilsson, Solna, Sweden, assignors to North American Philips Company, Inc., New York, N.Y., a corporation of Delaware Filed Sept. 3, 1963, Ser. No. 305,998

Claims priority, application Sweden, Sept. 5, 1962, 9,610/62

4 Claims. (Cl. 328—25)

Figure 1:
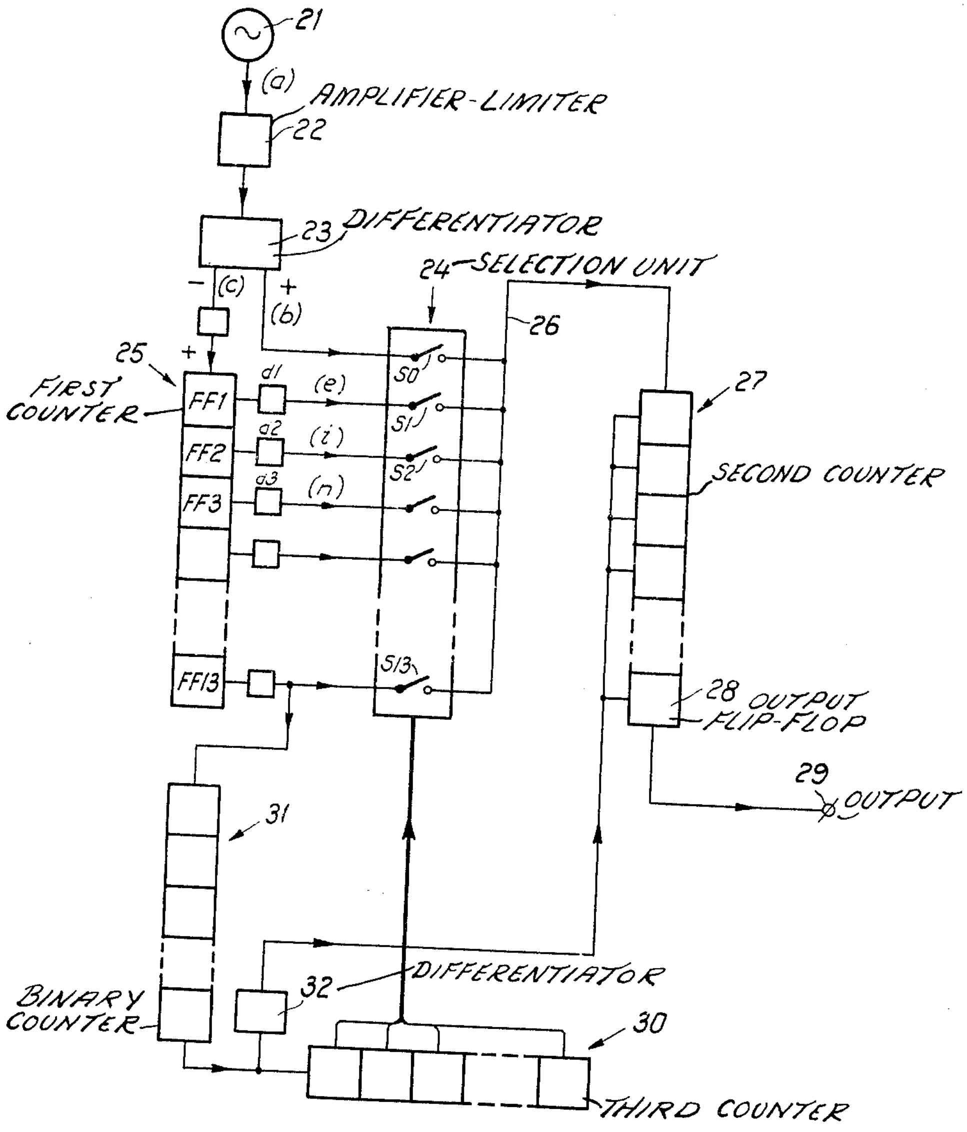

The present invention relates to a digital frequency synthesis device for producing an A.C.-voltage of adjustable frequency. Such a device can for example be used in systems for transmission of information by means of radio carrier between a transmitter and a receiver, wherein the frequency of the carrier is varied such that intentional disturbance of the information transmission is prevented. The invention is particularly but not exclusively useful in systems wherein it is required to maintain a representative phase position between transmitter and receiver, as for an example information transmission systems with phase shift modulation or radio navigation systems working with phase comparison between unmodulated high frequency waves (as well as hyperbolic systems).

According to the invention a digital frequency synthesis device for producing an A.C.-voltage of adjustable frequency comprises a device for generating a high frequency wave and means for deriving pulses from said high frequency wave. A cyclically operating first pulse counter to which said pulses are supplied consist of a number of flip-flop circuits connected in cascade and is provided with means for deriving, from the individual flip-flop circuits, output pulses of different polarities at switching on time and switching off time, respectively, of the flip-flop circuits. Pulses of one polarity are active as input control pulses in the said pulse counter cascade, and selectively operable connecting means supply pulses of the other polarity from various flip-flops to a cyclically operating second pulse counter connected to an output flip-flop and adapted to supply to said output flip-flop a trigger pulse for switching the same at each cycle of operation of the second pulse counter. The output flip-flop changes its output voltage between two values for generating the alternating output voltage of adjustable frequency.

The said pulses of the other polarity derived from each flip-flop of the first pulse counter form a plurality of pulse series shaped such that the pulse frequency of each pulse series is equal to half the pulse frequency of the pulse series derived from the preceding flip-flop in the counter. The pulses in all pulse series will appear in different time moments, so that the frequency of the rectangular A.C.-voltage from the output flip-flop can be shifted in an unambiguous way simply by actuating different ones of the said selectively operable connecting means. A very important feature of the device is that such a frequency shift in principle will take place under maintenance of a representative phase position of the voltages of different frequency. However, the said representative phase position can be lost at frequency shift and it is therefore, according to another feature of the invention, suitable to check and if necessary correct the phase of the rectangular voltage received from the output flip-flop by means of a cyclically operating phase checking pulse counter chain operated by the pulses derived from the high frequency wave and having an operation cycle equal to the sum of the cycles of the first and second pulse counters. Such a counter chain may for example consist of the first pulse counter and a further pulse counter having the same number of counting stages as the second pulse counter, and means arranged at the output of the phase checking pulse counter chain for deriving a pulse at each operation cycle of the said counter chain, which pulse is led to the second pulse counter for restoring all stages of this counter to a starting position.

According to another feature of the invention the phase of the output voltage can be varied as required by taking out the triggering pulse for the output flip-flop at different points of the operation cycle of the second pulse counter. This operation may, for example, be effectuated by means of a coincidence device adapted to react for coincidence between the count number in the said second counter and the number stored in a further counter for causing a pulse to be led to the output flip-flop at such coincidence, whereby the phase of the output voltage will be unambiguously determined by the actual setting of the said further pulse counter.

The invention is now explained more fully with reference to the accompanying drawings, in which—

Figure 2:
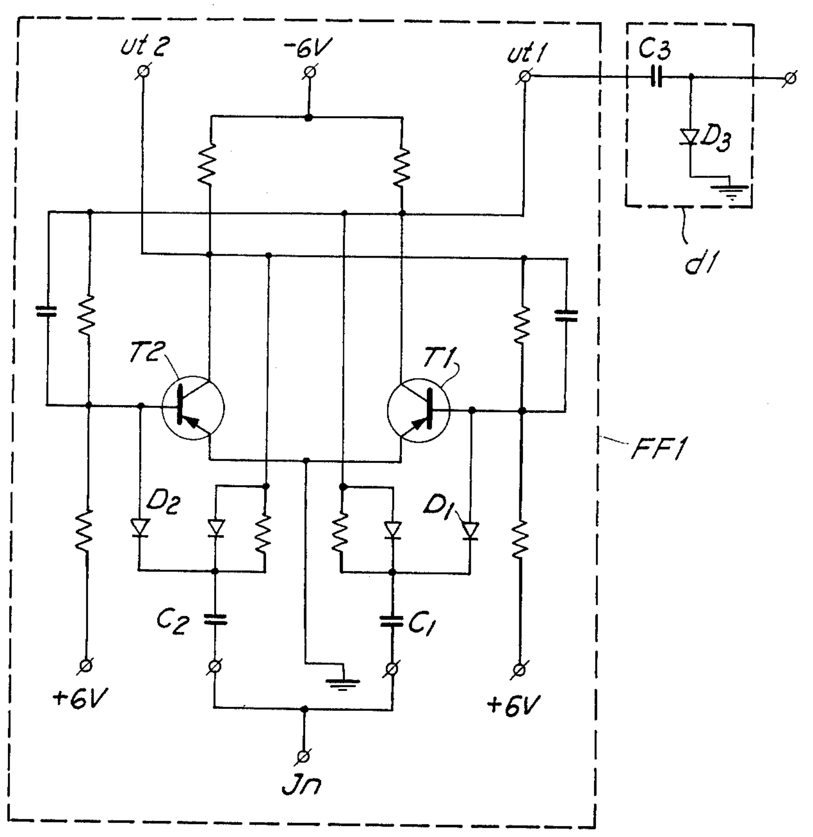
Figure 3:
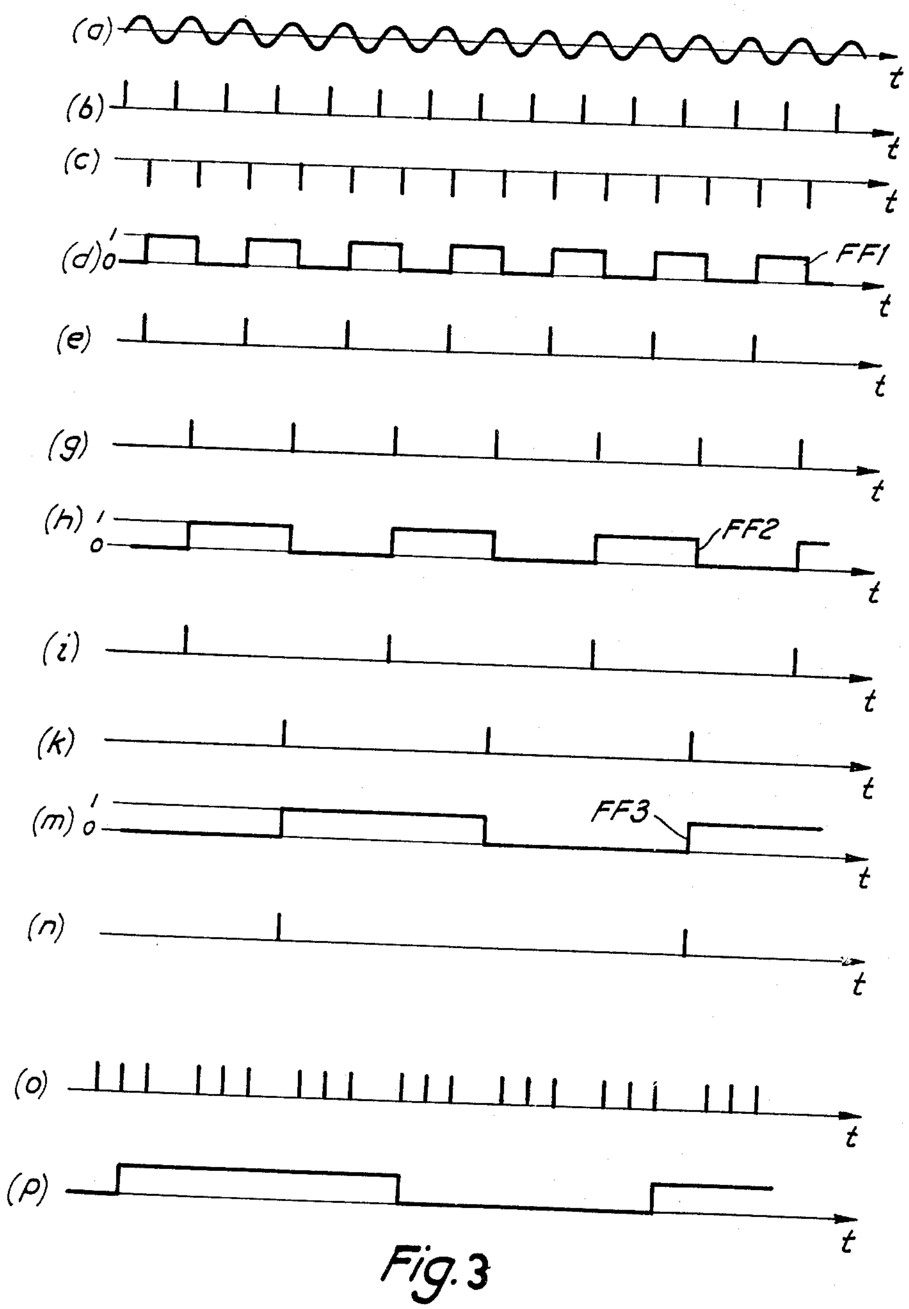
Figure 4:
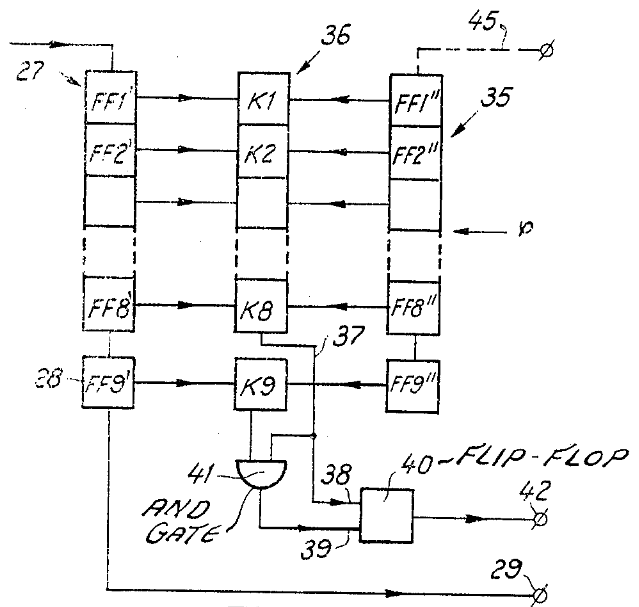
Figure 5:
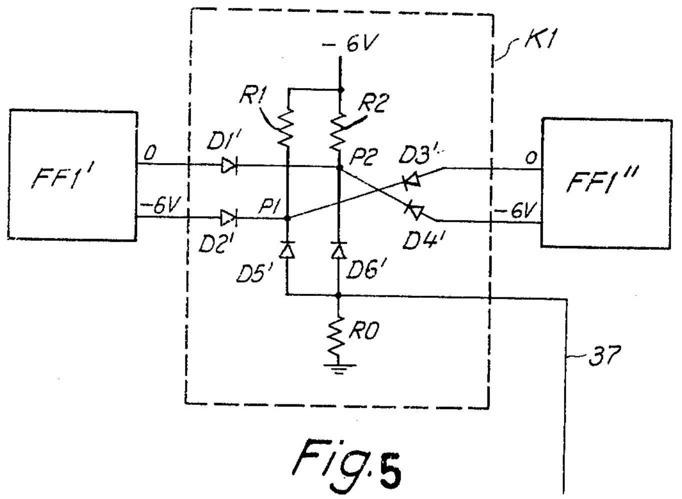

FIG. 1 shows an embodiment of the device according to the invention,

FIG. 2 shows an embodiment of the bistable flip-flops included in the device according to FIG. 1, FIG. 3 shows some time diagrams for explaining the function of the device according to FIG. 1, FIG. 4 shows a modification of the device according to FIG. 1 for adjusting the phase of the A.C.-voltage of varying frequency and FIG. 5 shows an embodiment of the comparing circuits included in the device according to FIG. 4.

Referring to FIG. 1 a high stable oscillator 21, for example operating at a frequency of 5 mc./s., delivers its output voltage (see FIG. 3(*a*)) to a device 22, in which the oscillator voltage is amplified and limited. The amplified and limited voltage from the device 22 is led to a differentiating device 23 for producing positive and negative pulses of short duration. The device 23 also comprises means for separating the positive and negative pulses so that the positive pulses (FIG. 3(*b*)) are fed out on a lead referenced + and the negative pulses (FIG. 3(*c*)) are fed out from the device on a lead referenced —. The positive pulses are lead directly to one of the terminals of a first switch S0 in a selection unit 24, while the negative pulses after polarity shifting are fed to the first stage of a first binary pulse counter 25 composed of a number of cascade connected bistable flip-flops FF1, FF2, FF3 etc.

Each flip-flop, which can be of the transistor embodiment shown in FIG. 2, is switchable between two different conditions of positions referenced 0 and 1, respectively, the position 0 in the shown example corresponding to one of the transistors, for example the transistor $T_1$, being conductive. The second transistor $T_2$ cut-off and the position 1 corresponds to the transistor $T_2$ being conductive and the transistor $T_1$ cut-off. The flip-flops are connected in cascade by connecting the output U*t*1 (FIG. 2) of a flip-flop to the input I*n* of the succeeding flip-flop. Each flip-flop, in its two different stable positions, produces two different voltage levels at its output. The trigger pulses for switching a succeeding flip-flop are produced by means of differentiating means situated at the input of each flip-flop (according to FIG. 2, in the shape of a RC-circuit comprising an input capacitor C1 and C2, respectively). A succeeding flip-flop is switched in at the moment when the foregoing flip-flop switches from the position 1 to the position 0, which in the device according to FIG. 2 corresponds to a voltage increase at the output U*t*1 and a positive trigger pulse at the base electrode of the transistor T1 and T2, respectively. Diodes D1 and D2 are used for suppressing pulses of the opposite polarity.

The pulse counter functions as follows:

Assume that the counter initially is adjusted to zero so that all the flip-flops or stages are in the position 0. Now, when the first pulse is received at the input of the first stage this stage switches to the position 1, while the rest of the stages remain in the position 0; when the second pulse is received the first stage is returned to the position 0 and the second stage switched to the position 1; when the third pulse is received the first stage is switched to the position 1 with the second stage remaining in the position 1; when the fourth pulse is received the first and second stages are returned to the position 0 and the third stage switched to the position 1 etc.

This is illustrated in FIG. 3 where the diagram (*d*) is the function waveform diagram of the first flip-flop or the first stage FF1 in the counter, (*g*) shows the trigger pulses derived from FF1 and used for switching the succeeding stage FF2, (*h*) is the function waveform diagram of stage FF2, (*k*) shows the trigger pulses derived from FF2 and used for switching the succeeding stage FF3 and (*m*) is the function diagram of FF3.

As is evident from FIG. 3 the switching frequency of a certain stage in the counter is always half the switching frequency of the foregoing stage. This general function description is valid for all the binary counters included in the device.

To each stage of the counter 25 are further connected means *d*1, *d*2 . . . (FIGS. 1, 2) for deriving pulses when switching the stage in opposite direction as compared with the switching direction which causes switching of the next succeding stage, thus in the given example, when switching the respective stage from the position 0 to the position 1. In the embodiment according to FIG. 2 the said means have the shape of a differentiating circuit, consisting of a capacitor C3 and a diode D3, connected to the output U*t*1. The diode D3 brings about suppressing of the positive pulses, which according to the foregoing are used as trigger pulses pass, while the negative pulses through an amplifying and polarity shifting stage (not shown) and are led to the selection unit (FIG. 1). The connection between the individual stages of the counter 25 and the selection unit is such that the pulse series derived from the first stage of the pulse counter 25 is led to a second switch S1 in the selection unit, the pulse series derived from the second stage in the counter is led to a third switch S2 in the selection unit, and so on.

The pulse series fed from the counter 25 to the different switches in the selection unit 24, which pulse series are shown in FIGS. 3(*e*), 3(*i*), 3(*n*), are so shaped that the pulse frequency in a certain pulse series is half the pulse frequency of the pulse series derived from the foregoing stage in the counter. Furthermore, no pulse in any pulse series coincides in time with any pulse in any of the other pulse series independent of the number of stages in the counter, i.e. the number of pulse series derived from the counter. The positive pulses derived from the differentiation device 23 are fed directly to the switch S0 and cannot coincide in time with an pulse in the pulse series fed to the succeeding switches in the selection unit. The latter pulse series are composed of pulses derived from negative pulses from the differentiation device 23, as the negative and positive pulses from the differentiation device 23 are mutually displaced by a half period of the oscillator voltage. Thus, no pulse in any of the pulse series fed to the selection unit coincides in time with any pulse in any of the other pulse series.

This character of the pulse series fed to the selection unit makes it possible to combine different pulse series into a resulting pulse series containing all the pulses in the selected pulse series simply by feeding the selected pulse series to a common lead. For this purpose all switches in the selection unit 24 have their second terminal connected to the common lead 26, which lead in turn is connected to the input or the first stage of a second binary pulse counter 27. The counter 27 is of conventional construction and operates as previously described. The last stage or the last bistable flip-flop 28 in the binary counter 27 delivers in its two stable positions two different voltages to an output terminal 29.

The portion of the device described so far works as follows. The required frequency is set by closing certain switches in the selection unit 24 so that the pulse series appearing on corresponding leads are fed to the common lead 26. As no pulses in the different pulse series coincide in time a pulse signal will appear on the lead 26 which signal contains the sum of the pulses in the selected pulse series. The pulses comprised in the sum signal are counted by the counter 27 and the final stage 28 is switched when the counter has received a predetermined number of pulses depending upon the number of stages in the counter. More particularly the final stage is switched when a pulse is received and all the preceding stages already are in the position 1. The preceding stages then simultaneously return to the position 0 and new counting is started with succeeding new switching of the final stage etc. It is evident that the period time and thus the frequency of the rectangular signal received from the final stage 28 is dependent upon the number of pulses per time unit in the applied pulse signal, i.e. dependent upon which ones of the switches in the selection unit 24 that are closed.

For illustrating this there is shown in FIG. 3(*o*) the sum pulse series which should be produced if the two first switches S0 and S1 in FIG. 1 are closed. The pulse series according to FIG. 3(*o*) is the sum of the pulse series shown in FIG. 3(*b*) and FIG. 3(*e*). FIG. 3(*p*) shows the output signal which should be produced by the final stage in the counter 27 if this counter were composed by only three stages plus the final stage when applying to this binary counter the pulse series shown in FIG. 3(*o*). In practice there is required a greater number of stages, for example, nine, in the second binary counter 27 for achieving an acceptable output signal, as the pulses in the resulting pulse series fed to the counter 27 when closing more than one switch in the selection unit do not appear with constant pulse intervals. In certain switch combinations, this can result in the two half-periods of the rectangular signal appearing at the output terminal 29 being different in length. The difference, however, can never be greater than one pulse interval, i.e. the difference with a nine stage counter 27 would be a maximum of $1/512$ of a period. By dividing the pulse frequency in the counter 27, as with a counter having a great number of stages, the phase modulation caused by the said difference will be unimportant. The resolution of the frequency selection or the distance between the different frequency channels is dependent upon the number of stages in the binary counters and the oscillator frequency. The latter should be substantially greater than the required frequency of the output signal at the terminal 29.

For avoiding the possibile difference between the length of half periods (phase modulation), due to the fact that switching of the final stage 28 and starting a new counting period in counter 27 for each new half period occurs at different settings of the counter 25, the counter 25 may eventually be zeroed upon each switching of the final stage 28 by means of differentiation means arranged at the output of the said final stage.

If $f$ is the frequency of the output signal which should be produced if only the series of positive pulses (or the series of negative pulses) from the differentiation device 23 were used, i.e. if only the switch S0 were closed, the frequency range within which the frequencies can be selected will be $0$–$2f$, that is, with the switch S0 open the range $0$–$f$ and with the switch S0 closed the range $f$–$2f$.

In the foregoing it has been assumed that the switches S0, S1, S2 . . . included in the selection unit have been actuated manually and individually for each switch.

However, for certain applications the frequency is shifted automatically in accordance with a predetermined program. For achieving such an automatic frequency shift the switches in the selection unit can be controlled from a third binary counting circuit 30, which is connected to the last stage of the first binary counter through a number of binary counting stages 31, as is shown in FIG. 1. The flip-flops included in the third binary counter then actuate the switches in the selection unit such that a certain combination of actuated flip-flops in the binary counter always corresopnds to a determined combination of closed switches. Connections between the counter 30 and the selection unit 24 are such that the first stage of the binary counter controls the switch S1 whereby the switch is closed when the first stage in the conuter is in the position 1 and open when the stage is in the position 0. The second stage in the counter 30 acts upon the switch S2 in the same way, and so on. The binary counter 30 and the selection unit 24 may be connected together in a number of different ways and it is further possible to change the program for controlling the switches S0, S1 . . . by changing the connection between the binary counter 30 and the unit 24, for example by the replacement of a connection plate. The highly stable oscillator 21, used in this case, acts not only as frequency and pulse producer but as a clock for effecting the automatic frequency shift in predetermined moments.

By combining the pulse series which are built up according to a binary system, the advantage achieved is that the output voltage at the output terminal in principle maintains a representative phase position even after frequency shift. The described device can therefore suitably be used in equipment in which the information transmission between one or more transmitters and a receiver is based upon phase comparison, for example radio navigation systems working with phase comparison between unmodulated radio carriers, information transmission systems with phase shift modulation etc., wherein it is important that a representative phase position between transmitter and receiver is maintained. However, the representative phase position can be lost after frequency shifting if the switches in the selection unit function at somewhat different moments. The phase position is therefore checked and if necessary adjusted occasionally. In the device according to FIG. 1 this is effected by means of a differentiating device 32 connected to the final stage of the binary counter 31, for deriving a pulse each time the said final stage switches from the position 1 to the position 0. This pulse is led to all the stages of the second binary counter 27 for zeroing the counter 27 at the appearance of such a checking pulse.

The binary counter 31, having a number of stages equal to the number of stages in the second binary counter 27, is connected in series with the first binary counter 25 and is controlled from the final stage of this counter. The function of the checking pulse is described by means of an example.

It is first assumed that only the last switch, i.e. the switch S13 in FIG. 1 is actuated. The pulse series fed to the first stage of the binary counters 27 and 31 are then both received from the final stage of the first binary counter 25 and have consequently the same pulse frequency. Providing the binary counter 27 and the counter 31 were in zero position simultaneously from the beginning they will be stepped forward synchronously and will reach the condition in which all stages are in the position 1 simultaneously due to the fact that the two counters contain the same number of stages. When receiving the next pulse from the last stage of the counter 25 all stages in both the counter 27 and the counter 31 will switch to the position 0 and a checking pulse is derived from the last stage of the counter 31. At the appearance to this checking pulse, in normal operation without disturbances, all stages of the counter 27 will have switched over to the position 0 and the checking pulse has no influence. Should, however, any of the stages in the counter 27 be in the position 1 at the time of the appearance of the checking pulse, these stages will be zeroed by the checking pulse, so that the counters 31 and 27 in the future work synchronously, maintaining the required phase position of the output signal at the terminal 29.

If it now is assumed that further switches or other switches in the selection unit 24 are closed the binary counter 27 will be stepped forward more rapidly than the counter 31. However, as the pulse frequency in all the pulse series, selected by closing the different switches, is a multiple of the pulse frequency of the pulse series fed to the binary counter 31, the checking pulse will still appear, in normal operation without disturbances, in a moment when all the stages of the counter 27 have just switched over to the position 0 for all combinations of closed switches in the unit 24. The oscillator 21 thus functions as a clock in combination with the binary counters 25 and 31 for producing clock pulses which serve as checking pulses at the output of the differentiating device 32. The checking pulses or clock pulses from the output of the device 32 appear, for the system in use, at predetermined moments and cannot in any way be controlled by switching operations or the like. These pulses are therefore suitable to be used as a fixed time standard for checking the phase position of the output signal independent of the frequency of this output signal.

By checking the phase position as described, it is possible to place lower requirements upon the control of the switches included in the selection unit, and the device can be simplified and manufactured at a lower cost.

Instead of controlling the binary counter 31 with the same pulse series fed to the last switch in the selection unit, said pulse series composed of pulses produced at the switching over of the last stage in the counter 25 from the position 0 to the position 1, it is also possible to use the trigger pulses produced at the switching over of the last stage in the counter 25 from the position 1 to the position 0 for controlling the first stage of the counter 31.

In the foregoing it has been assumed that the selection unit 24 is composed of manually or automatically controlled switches, as relay contacts or the like. In practice these switches are suitably replaced by AND-gates with one input connected to the respective stage of the first binary counter 25 and the other input connected to the device for producing the automatic frequency shift, in the shown example the binary counter 30. Each AND-gate then passes the pulse series appearing at the said one input to the common lead 26 if a predetermined signal from the binary counter 30 is fed to the other input. Otherwise the pulse series is inhibited by the gate. The connection between the flips-flops included in the counter 30 and the AND-gates included in the selection unit and thus the program for the frequency shift can have any wanted configuration. If it is required to cover only a frequency range from $f$–$2f$ the first switch or AND-gate S0 in the selection unit 24 may be dispensed with and replaced by a continuous connection line.

As mentioned, the described device is phase stable and the rectangular signal appearing at the output terminal 29 may be regarded as a reference signal having a predetermined phase position. If it is desired to produce an A.C.-voltage having an adjustable phase position in relation to the reference phase determined by the voltage at the output terminal 29, the device shown in FIG. 4 can be used.

In FIG. 4 there is shown the second binary counter 27 with the final stage 28 from which the phase stable reference signal is derived and led to the output terminal 29. The flip-flops included in the counter 27 are in FIG. 4 referenced FF1′, FF2′ . . . and pulses are applied permanently to the input of the counter 27 so that the counter operates continuously.

The reference numeral 35 designates a phase set unit composed of a number of bistable flip-flops FF1″, FF2″ . . . which may be of the same construction as the flip-flops FF1′, FF2′ . . . included in the counter 27. The number of flip-flops in the unit 35 is equal to the number of stages in the counter 27. The flip-flops included in the unit 35 may for the moment be regarded as individually actuated.

The flip-flops in the counter 27 and the unit 35 are connected pairwise to each other via comparison circuits K1, K2 . . . one for each pair of flip-flops, in a coincidence device 36. Thus, the two first flip-flops FF1′ and FF1″ in the counter 27 and the unit 35, respectively, are connected to each other through a first comparison circuit K1, the two succeeding flip-flops FF2′, FF2″ are connected to each other through a second camparison circuit K2, etc.

The object of the comparison circuits is to compare the two flip-flops associated with each comparison circuit and indicate if the flip-flops are in the same position or not. Equality between the positions of the flip-flops is indicated by means of a characteristic voltage appearing at the output of the respective comparison circuits. All comparison circuits except the last one are connected to a common output lead 37, on which a characteristic voltage change appears at the moment the continuously operating counter 27 assumes a condition in which the position of all flip-flops but the last one coincides with the position of the corresponding flip-flops in the unit 35.

The last comparison circuit K9, which compares the position of the final stage 28 with the position of the corresponding flip-flop in the phase set unit, also produces the characteristic voltage when the two flip-flops are in the same position.

The common output lead 37 is connected to one of the inputs 38 of a bistable output flip-flop 40 which can be constructed as shown in FIG. 2 except that it is provided with two separate inputs 38, 39 each leading to a transistor. The common output lead 37 is also connected to an AND-gate 41 which has two inputs, the second input of which is connected to the output of the last comparison circuit K9. The AND-gate passes the characteristic voltage to the flip-flop 40 only if the said characteristic voltage is present on both inputs of the gate. A characteristic voltage change appearing at the said one input 38 switches the flip-flop in the direction 0→1 and a characteristic voltage change appearing at the second input 39 switches the flip-flop in the direction 1→0.

The function of the device is explained by means of an example, it being assumed that the counter and the phase set unit is provided with nine stages including the final stage. Assume first that all flip-flops in the phase set unit 35 are in the position 0 (the stored number thus equal to 0) and that the output circuit 40 and all stages in the counter 27 including the final stage are in the position 0. If pulses now applied at the input of the counter 27 the final stage 28 of the counter will be switched to the position 1 when receiving the 256th pulse. At the same time all the foregoing stages in the counter will return to the position 0. Coincidence for the first eight stages then occurs and the characteristic voltage change will appear on the common output lead 37, so that flip-flop 40 is also switched to the position 1. Thus the leading edges of the two rectangular output voltages on the terminals 29 and 42, respectively, coincide exactly in time. After receiving another 256 pulses the output stage 28 is switched in the direction 1→0 at the same time as the first eight stages in the counter return to the position 0. Now there is coincidence for both the first eight stages and the ninth stage or the final stage and the characteristic voltage change appears on both inputs of the AND-gate 41, so that the flip-flop 40 is also switched in the direction 1→0. Both edges of the produced rectangular output voltages coincide in time and the output voltages are exactly in phase. If for instance the first flip-flop FF1″ in the unit 35 is switched over to the position 1, while the rest of the flip-flops remain in the position 0, so that the stored number is equal to 1, a coincidence pulse from the first eight stages and switching of the flip-flop 40 in the one or the other direction will occur in a moment displaced one pulse interval of the applied pulse signal as compared with the moment for switching the final stage 28 of the counter 27, so that the output signal on the terminal 42 will be phase displaced a small value in relation of the output signal on the terminal 29. If the number stored in the unit 35 is equal to 2, the flip-flop 40 will switch at a moment displaced by two intervals of the applied pulse signal relative to the switching of the final stage 28. A greater phase displacement is thereby produced.

Provided that the pulse interval of the applied pulse signal is constant, each number stored in the unit 35 will correspond to a certain time displacement, i.e. a certain phase displacement $\varphi$ between the two output signals. Contrarily, it is possible to determine the instantaneous phase displacement of the two output signals by reading the number stored in binary form in the unit 35.

If the pulse counter 27 receives a pulse signal composed of more than one of the pulse series from the pulse counter 25 (FIG. 1) the resulting pulse signal will have a varying pulse interval which is alternatively equal first to the interval and then to half the interval of the pulse series from the counter 25 having the highest pulse frequency. A small deviation will then appear between the phase displacement set in the unit 35 and the actual phase displacement. The deviation, however, can never be greater than one unit in the counter 27, i.e. the deviation is a maximum of $\frac{1}{512}$ of a period for a counter with nine stages.

In order to achieve a high resolution in the setting of the phase displacement and to decrease the said deviation between set and real phase displacement the counter 27 should contain a great number of stages.

The last comparison circuit K9 could possibly be dispensed with and the flip-flop 40 switched only by means of the characteristic voltage change on the lead 37, indicating coincidence between the first eight stages. In this case, however, an uncertainty of 180° is achieved and further means must therefore be arranged for ensuring that the phase displacement initially lies within the wanted range 0°–180° or 180°–360°.

FIG. 5 shows a portion of the device according to FIG. 6, more particularly the first units FF1′, K1, FF1″ in the binary counter 27, the coincidence device 36 and the phase set unit 35, respectively. Suitable flip-flops are known in a lot of types and the flip-flops are therefore shown only in block schematic form while an embodiment of the comparison circuit K1 is shown in detail for illustrating the function of the coincidence device. It is assumed that the remaining comparison circuits in the coincidence device are constructed in the same way.

The flip-flops have each two outputs, which can either deliver the voltage 0 or the voltage −6 v. In the shown condition representing the position 0 the upper output has the voltage 0 and the lower output −6 v., while in the second stable condition, position 1, the voltages have been interchanged.

The comparison circuit consists of a number of two terminal diodes D1′, D2′, D3′, D4′ which are connected by a first terminal to the outputs of the two flip-flops and by a second terminal pairwise connected with each other via points P1, P2. These points are connected on the one hand to a voltage source of −6 v. through resistances R1 and R2, respectively, and on the other hand to an output lead 37 through diodes D5′ and D6′, respectively. The output voltage is derived across an output resistance R0 connected to earth.

The function of the comparison circuit is as follows. If the two flip-flops, as is shown in the drawing, have their two upper outputs on the voltage level 0 and the two lower outputs on the voltage level −6 v., the diodes D1′ and D3′ are conductive and the voltage of the points P1, P2 will be 0. If the two flip-flops have their upper output on the voltage level −6 v. and the lower output on the voltage level 0 the diodes D2′ and D4′ are conductive and the voltage of the points P1, P2 will also be 0. No current flows through the output resistance R0 and the voltage of the output lead 37 is 0. If FF1′ is set in the shown position and FF1″ is set the opposite position the diodes D1′ and D4′ will be conductive, and the voltage of the point P2 will be 0, while the diodes D2′ and D3′ are cut-off. Current now flows from earth through output resistance R0, diode D5′ and resistance R1 to the voltage source of −6 v. The output lead will receive a negative voltage of −6 v. provided that the resistance R0 is large compared with the resistance R1. If FF1″ is set in the shown position and FF1′ is set in its opposite position the diodes D2′, D3′ will be conductive and the diodes D1′ and D4′ cut-off, current then flows from earth through output resistance R0, diode D6′ and resistance R2 to the voltage source. The same output voltage of −6 v. is produced on the output lead 37. As mentioned previously the output lead 37 is common for the first eight comparison circuits and the voltage of the lead 37 thus will have the value −6 v. as long as any of the first eight flip-flops in the counter 27 is in the opposite position compared with the corresponding flip-flop in the unit 35. Not until the moment when the counter 27 is switched to a position in which all the eight flip-flops are in the same position as the corresponding flip-flops in the unit 35 will a voltage change from −6 v. to 0 occur on the output lead 37. This voltage change is sensed in the usual way by differentiating means arranged at the input of the flip-flop 40 for producing a pulse which triggers the flip-flop.

In the foregoing it has been assumed that the phase set unit 35 consists of a number of individually actuated bistable flip-flops. In practice, however, the unit 35 preferably has the shape of a binary pulse counter, a change of the phase displacement between the two output voltages being effected by feeding pulses to the first stage of this binary pulse counter through an input lead 45 (shown in dotted line in the drawing). In order to facilitate the setting of a required phase displacement the unit 35 is suitably shaped as a binary counter operating in both directions, so that input pulses of one polarity increase the number stored in the counter and pulses of opposite polarity decrease the number stored in the counter.

The rectangular output voltage from the device has a high harmonic content and, instead of using the fundamental tone, any of the harmonics be used. Suitable filter means are for this purpose to be arranged at the output terminal 29 or the output terminal 42.

What is claimed is:

1. A digital frequency synthesis device for producing an output voltage of adjustable frequency, comprising means for generating a series of input pulses, a first pulse counter connected to said means for receiving said input pulses, said first pulse counter comprising a plurality of bistable stages connected in cascade, means connected to each of said stages for deriving an intermediate pulse indicative of a change of state of each of said stages, selectively operable connecting means having provision for input and output, means connected to the input of said selectively operable connecting means for supplying thereto said intermediate pulses from said first pulse counter, a second pulse counter comprising a plurality of cascaded bistable stages including an input stage and an output stage, means connecting the output of said selectively operable connecting means to the input stage of said second pulse counter, the output stage of said second pulse counter alternating states at the end of each cycle of said second counter thereby generating the output voltage of adjustable frequency, a cyclically operating phase checking pulse counter chain comprising the said first pulse counter serially connected to a further pulse counter, said further pulse counter having the same number of counting stages as the said second pulse counter, means connected to said further pulse counter for deriving a further pulse at each operation cycle of the said counter chain, and means connecting said means for deriving to said second pulse counter for restoring all stages of said second counter to a starting position upon the introduction of said further pulse thereto in order to maintain predetermined phase conditions for various output frequencies.

2. A digital frequency synthesis device for producing an output voltage of adjustable frequency, comprising means for generating a series of input pulses, a first pulse counter connected to said means for receiving said input pulses, said first pulse counter comprising a plurality of bistable stages connected in cascade, means connected to each of said stages for deriving an intermediate pulse indicative of a change of state of each of said stages, selectively operable connecting means having provisions for input and output, means connected to the input of said selectively operable connecting means for supplying thereto said intermediate pulses from said first pulse counter, a second pulse counter comprising a plurality of cascaded bistable stages including an input stage and an output stage, means connecting the output of said selectively operable connecting means to the input stage of said second pulse counter, the output stage of said second pulse counter alternating states at the end of each cycle of said second counter, thereby generating the output voltage of adjustable frequency, a pre-set phase setting counter comprising a plurality of serially interconnected binary stages, a multi-stage serially connected comparator, each of said comparator stages having a first input connected to one of said stages of said second counter and a second input connected to a corresponding stage of said pre-set phase setting counter, and output means connected to said comparator for indicating the resultant of said pre-set phase setting counter relative to the output of said second counter.

3. A digital frequency synthesis device for producing an output voltage of adjustable frequency, comprising means for generating a series of input pulses, a first pulse counter connected to said means for receiving said input pulses, said first pulse counter comprising a plurality of bistable stages connected in cascade, means connected to each of said stages for deriving an intermediate pulse indicative of a change of state of each of said stages, selectively operable connecting means having provision for input and output, means connected to the input of said selectively operable connecting means for supplying thereto said intermediate pulses from said first pulse counter, a second pulse counter comprising a plurality of cascaded bistable stages including an input stage and an output, means connecting the output stage of said selectively operable connecting means to the input stage of said second pulse counter, the output stage of said second pulse counter alternating states at the end of each cycle of said second counter, thereby generating the output voltage of adjustable frequency, a cyclically operating phase checking pulse counter chain comprising the said first pulse counter serially connected to a further pulse counter, said further pulse counter having an output and the same number of counting stages as the said second pulse counter, means connected to the output of said further pulse counter for deriving a further pulse at each operation cycle of the said counter chain, and means connecting said means for deriving to said second pulse counter for restoring all stages of said second counter to a starting position upon the introduction of said further pulse thereto in order to maintain predetermined phase conditions for various output frequencies, said selectively operable connecting means comprising a plurality of two input selectively operable gating units, the first input of each of said gating units connected to a respective stage of said first counter, a third counter comprising a plurality of serially connected bistable stages, the input of a first of said third counter stages connected to the output of said further counter, means connecting each of said stages to the second input of each of the respective gating units whereby the stage of said selectively operable gating units will be dependent upon the state of said third counter, and thereby vary from cycle to cycle.

4. A digital frequency synthesis device for producing an output voltage of adjustable frequency, comprising means for generating a series of input pulses, a first pulse counter connected to said means for receiving said input pulses, said first pulse counter comprising a plurality of bistable stages connected in cascade, means connected to each of said stages for deriving an intermediate pulse indicative of a change of state of each of said stages, selectively operable connecting means having provision for input and output, means connected to the input of said selectively operable connecting means for supplying thereto said intermediate pulses from said first pulse counter, a second pulse counter comprising a plurality of cascaded bistable counting stages including an input stage and an output stage, means connecting the output of said selectively operable connecting means to the input stage of said second pulse counter, the output stage of said second pulse counter alternating states at the end of each cycle of said second counter, thereby generating the output voltage of adjustable frequency, cyclically operating phase checking pulse counter chain comprising the said first pulse counter serially connected to a further pulse counter, said further pulse counter having an output and the same number of counting stages as the said second pulse counter, means connected to the output of said further pulse counter for deriving a further pulse at each operation cycle of the said counter chain, and means connecting said means for deriving to said second pulse counter for restoring all stages of said second counter to a starting position upon the introduction of said further pulse thereto in order to maintain predetermined phase conditions for various output frequencies, a pre-set phase setting counter comprising a plurality of serially interconnected binary stages, a multi-stage serially connected comparator, each of said comparator stages having a first input connected to one of said stages of said second counter and a second input connected to a corresponding stage of said pre-set phase setting counter, output means connected to said comparator for indicating the resultant of said pre-set phase setting counter relative to the output of said second counter, said selectively operable connecting means comprising a plurality of two input selectively operable gating units, the first input of each of said gating units connected to a respective stage of said first counter, a third counter comprising a plurality of serially connected bistable stages, the input of a first of said third counter stages connected to the output of said further counter, means connecting each of said third counter stages to the second input of each of the respective gating units whereby the state of said selectively operable gating units will be dependent upon the state of said third counter, and thereby vary from cycle to cycle.

References Cited by the Examiner

UNITED STATES PATENTS

| | | | |
|---|---|---|---|
| 2,896,092 | 7/1959 | Pugsley | 307—88.5 |
| 3,036,223 | 5/1962 | Phillips | 307—88.5 |

ARTHUR GAUSS, *Primary Examiner.*

J. S. HEYMAN, J. ZAZWORSKY, *Assistant Examiners.*